May 13, 1924.

L. L. HARDEMAN

WELL STRAINER AND CLEANER

Filed May 29, 1922

1,493,747

INVENTOR.
Lyman Lynch Hardeman.

Patented May 13, 1924.

1,493,747

UNITED STATES PATENT OFFICE.

LYMAN LYNCH HARDEMAN, OF LEAVENWORTH, KANSAS.

WELL STRAINER AND CLEANER.

Application filed May 29, 1922. Serial No. 564,563.

*To all whom it may concern:*

Be it known that I, LYMAN LYNCH HARDEMAN, a citizen of the United States, residing at 9th Avenue and Michigan, in the city of Leavenworth, in the county of Leavenworth and State of Kansas, have invented a new and useful Well Strainer and Cleaner.

My invention relates to obtaining water from under ground sources and keeping the sand, silt, etc., cleaned from under ground well strainers or screens as follows.

Figure 1:
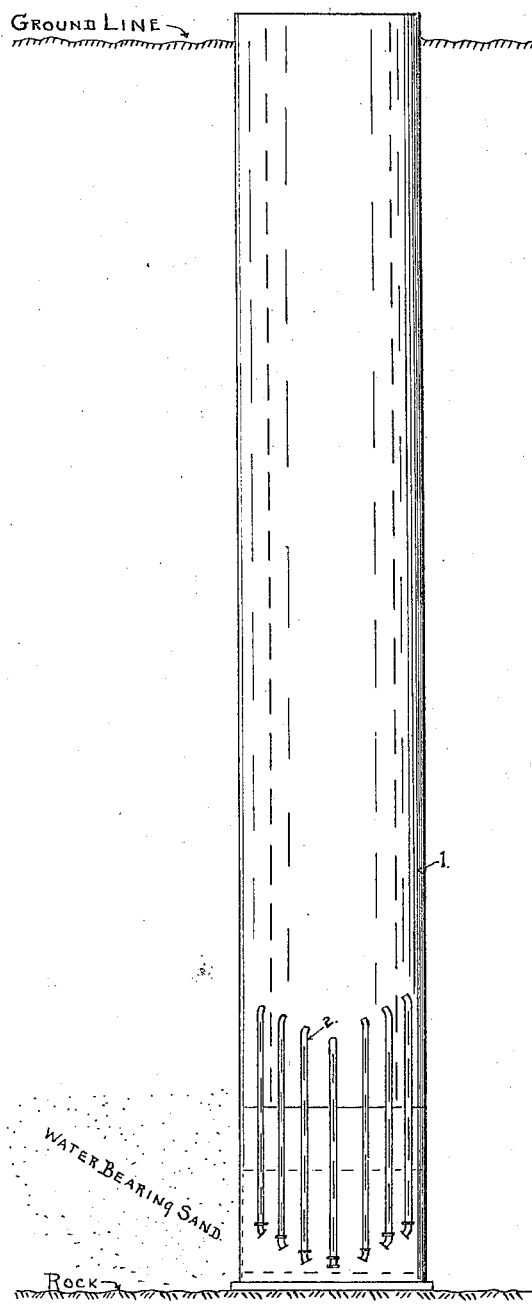
Figure 1 is a vertical view of the entire well.
Figure 3:
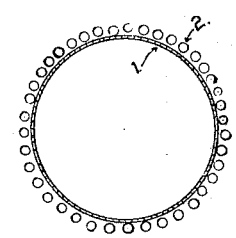
Figure 3 is a horizontal section through strainer of well.
Figure 2:
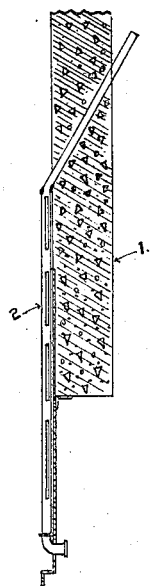
Figure 2 is a vertical section through strainer and shaft of well.
Figure 4:
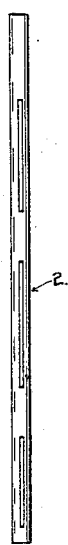
Figure 4 is a vertical view of the slit pipe strainer and cleaner.

The well shaft 1 is sunk into the water bearing strata in any well known manner. The shaft is usually provided with a perforated strainer or screen on the lower end to permit the water to flow into the well. This is common practice. According to my invention I provide a plurality of slit pipes 2 arranged in circular series and fastened to the outside of the well strainer or screen. The pipes are arranged longitudinally of the shaft and have their lower ends in open communication with the space confined within the strainer near the bottom, the pipes extending on the outside of the strainer to various elevations with the upper ends extending into the shaft to be accessible for future use. Since the chief difficulty in obtaining water from underground sources in large quantities through a well is caused by the fact that the flow of water in the well through the strainer or screen will in time carry sand, silt, etc., against the strainer or screen and choke it, (this is generally termed "sanding in") and thereby greatly reducing or entirely stopping the flow of water through the strainer or screen and rendering the well useless, it will be apparent that my invention is a decided improvement over wells built according to standard practice. For example, the pipes 2 are slit at intervals of different spacing on each quarter point whereby water bearing strata may enter and be conducted down the pipes into the well. When the strainer becomes sanded in, it can be unsanded or cleaned and the surrounding water veins restored by forcing water at high pressure through the slits in the pipes 2, thereby cutting the surrounding sand, silt, etc., loose and conducting it into the well where it may be removed.

What I claim and desire to secure by Letters-Patent is:

1. A well shaft having a strainer including a plurality of vertical pipes, the ends of which communicate with space within the shaft, the intermediate portions of the pipes being outside the shaft and having slits therein to receive water from the surrounding water bearing strata.

2. A well shaft having a strainer, including vertical pipes outside the shaft provided with slits, the respective ends of the pipes communicating with the interior of the shaft.

3. A well shaft comprising a tube and a plurality of pipes on the outside of the tube having openings, the ends of the pipes communicating with the interior of the shaft.

4. A well shaft comprising a tube and a plurality of pipes on the outside of the tube having openings, the ends of the pipes communicating with the interior of the shaft and the pipes being arranged at various elevations above the bottom of the shaft.

LYMAN LYNCH HARDEMAN.